Patented Aug. 23, 1927.

1,640,136

UNITED STATES PATENT OFFICE.

RALPH B. SMITH, OF ENDICOTT, NEW YORK.

ADHESIVE PASTE.

No Drawing. Application filed April 26, 1926. Serial No. 104,840.

This invention relates to the manufacture and production of an improved paste which is especially, but not necessarily, designed for use in the making of uppers and counters for leather shoes.

More specifically, the invention has reference to a paste including a novel association of ingredients coacting to produce a mixture which is exceptionally satisfactory for securing together plies of material in laminated leathers employed in the manufacture of shoes.

My principal aim is to generally improve upon compounds of this class by providing one which is simple to make, inexpensive in manufacture and sale, and such that includes component parts of such common nature as to render them readily accessible, these parts mutually coacting to provide an intimate mixture, wherein each part contributes towards the attainment of an efficient wet paste easy to apply, quick to dry, and tenacious in adhering qualities.

In making the improved paste, I employ as one of the main ingredients, cow's milk. I take for instance one gallon of cow's milk and allow the same to become sour and thick. The important point to remember here is that the butter fat and oil ingredients are not removed from the milk.

Another constitutent employed in the product is flax seed meal. Proportionately speaking, I use one quarter pound of this flax seed meal, placing the same in one pint of water and boiling the meal laden water. This forms a juice which is added to the sour milk.

Next, I employ approximately two ounces of Spring wheat flour. This is mixed to form a paste by adding a quart of the mixture of sour milk and flax seed juice. The flour paste thus produced is then mixed with the whole mixture of sour milk and flax seed meal juice.

The fourth ingredient consists in the employment of about two ounces of laundry starch mixed with enough water to make a paste, and this starch paste is added to the already made mixture of the first three ingredients. Now, all four of the constituents or parts are beaten together and thoroughly mixed until they assume a frothy state. This usually requires about fifteen minutes. The thing to bear in mind being that the ingredients must be thoroughly mixed. Then the complete mixture is placed in a container which is in turn placed on a fire and boiled for fifteen minutes.

Finally, the cooked product is removed from the fire and the stirring is continued, after which two ounces of leather dust is added to complete the product. It might be stated that leather dust is a refuse material which is collected from the different operations in the manufacture of leather shoes.

The paste thus made will serve efficiently for tightly securing together two plies of leather, or one ply of cloth to a complemental ply of leather.

An outstanding feature of the improved paste is that it insures a positive connection between the plies of material, yet embodies no ingredients which are harmful to the texture of the material.

It is believed that by considering the detailed description, a very clear understanding of the invention will be obtained. Therefore, a more lengthy description is deemed unnecessary.

Having thus described the invention, what I claim as new and desire to secure by Letters Patent is:—

A boiled adhesive paste comprising one gallon of sour cow's milk, an aqueous extract made from boiling one-fourth pound of flax seed meal in one pint of water and filtering and pressing out the extract, two ounces spring wheat flour, two ounces of laundry starch, and water sufficient in quantity to form a paste, to which, after the boiling, two ounces of leather dust has been added.

In testimony whereof I affix my signature.

RALPH B. SMITH.